July 7, 1925.

A. V. CONOVER

LANTERN

Filed July 17, 1924

1,544,968

INVENTOR
Arthur V. Conover
BY Redding & Greeley,
O'Shea & Campbell ATTORNEYS

Patented July 7, 1925.

1,544,968

UNITED STATES PATENT OFFICE.

ARTHUR V. CONOVER, OF PHILADELPHIA, PENNSYLVANIA, ASSIGNOR TO INTER-FLASH SIGNAL CORPORATION, OF NEW YORK, N. Y., A CORPORATION OF NEW YORK.

LANTERN.

Application filed July 17, 1924. Serial No. 726,434.

*To all whom it may concern:*

Be it known that I, ARTHUR V. CONOVER, a citizen of the United States, residing in Philadelphia, in the State of Pennsylvania, have invented certain new and useful Improvements in Lanterns, of which the following is a specification, reference being had to the accompanying drawing, forming a part hereof.

This invention relates to the lenses used in signal lanterns and has for its principal object to provide a lens or series of lenses surrounding the source of light which will permit unobstructed passage of the light rays emanating therefrom and results, in effect, in a plurality of beams directed in a horizontal plane in all directions through 360° without any unilluminated areas therebetween or any illuminated areas unaffected by a lenticular surface. Accordingly the lantern comprises a plurality of bull's-eye lenses arranged in an annular series about a source of light with the centers of the bull's-eye in substantially the horizontal plane including the light source. More specifically, the bull's-eye lenses are formed on their outer surfaces with a plurality of vertically disposed, parallel, convex lenticular sufaces and on their inner surfaces with a plurality of annular concentric convex lenticular surfaces, the proximate edges of said lenses being disposed along chords of certain of the annular lenticular surfaces.

In order that the invention may be clearly understood and readily carried into effect the same will now be described more fully with reference to the accompanying drawings illustrating a preferred embodiment thereof and in which.

The frame of the lantern comprises the base $a$ formed with an annular seat $a'$ which is adapted to receive and support the annular series of lenses $b$. Surmounting the lenses is a cap $c$ extending outwardly as at $c'$ beyond the marginal surfaces of the lenses to afford some protection from the weather and formed with an annular seat $c^2$ to engage the upper edges of the annular series of lenses $b$. In the cap, as at $c^3$, is formed an opening or vent for the escape of heated air and products of combustion which may be formed within the lantern when the source of light is formed by a flame. In this event one or more apertures $a^2$ may be formed in the base for the admission of fresh air to support the combustion. As a protection against the weather a deflector $d$ may be conveniently mounted above the vent $c^3$ in a manner which will be readily understood. Suitable bolts or screws $e$ pass through apertures $a^3$ in the seat $a'$ and engage appropriate threaded apertures $c^4$ in the seat $c^2$. These screws permit the ready assembly and disassembly of the lantern and at the same time retain the component elements as a rigid whole.

Figure 1:
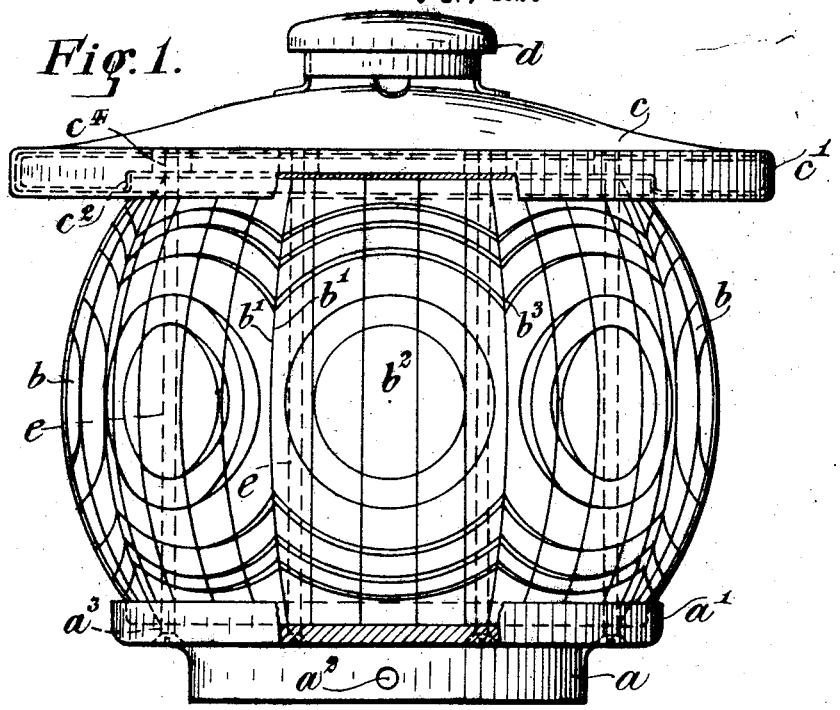
Figure 1 is a view in elevation and partly in section showing the lantern and the arrangement of lenses therein according to the present invention.
Figure 2:
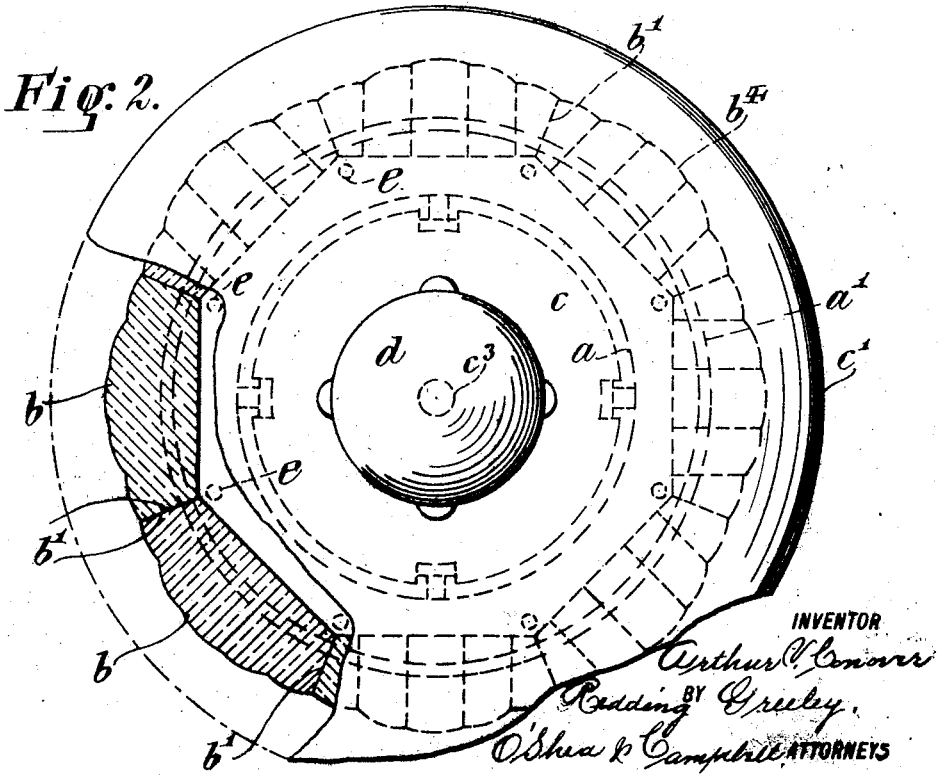
Figure 2 is a view looking from above in Figure 1, parts being broken away in the interest of clearness.

Any number of individual bull's-eye lenses $b$ may comprise the lens as a whole. In the illustrated embodiment the series is shown as composed of eight such lenses but it will be apparent that any number may be availed of, dependent, for instance, upon the size of the lantern. Heretofore when it has been attempted to associate a plurality of bull's-eye lenses to throw beams of light in more than one direction from a single source of light, each bull's-eye lens has been seated in an opening in a frame. The use of such frames has been unsatisfactory since it has obstructed the passage of light therethrough and has resulted in a number of areas in the light emanating from the lantern which have not been illuminated with the result that a series of beams of light have been thrown out rather than a continuous ray extending in all directions in a horizontal plane through 360°. In order to avoid this condition it is proposed according to the present invention to permit no metallic non-transparent surface nor any surfaces of plane glass between the concentric rings of the adjacent bull's-eye lenses. Accordingly, the vertical edges of the bull's-eye lenses are cut off along chords of the outer series of annular convex lenticular surfaces as at $b'$. These edges are symmetrical with respect to the center $b^2$ of the respective bull's-eye lenses so that the respective convex annuli meet as at $b^3$. In this manner there is no transparent portion between the annuli of adjacent bull's-eye lenses nor is there any area of plane glass, but every portion of the light transmitted through the lenses is affected by a lenticular surface. The lenticular annuli are preferably disposed upon the inner surfaces of the lenses while the outer surfaces may be conveniently formed as a series of vertically disposed parallel lenses $b^4$. The respective edges $b'$, may of course, be beveled as indicated in Figure 2 to facilitate the disposition of the bull's-eye lenses about the source of light along chords of a circle described about the light source.

It will thus be seen that a lantern has been provided having a lens entirely surrounding, in horizontal directions, a source of light, and in which the lenses are rigidly secured with respect to each other and to the base and top of the lantern, while no portion of the light emanating from the source of light is interfered with by non-transparent frame elements (the retaining screws $e$ being of course negligible) and every bit of the light transmitted by the lens is affected by a lenticular surface.

Changes in details of design and in form and disposition may be made without departing from the spirit of the invention.

What I claim is:

1. In a lantern, in combination, a plurality of bull's-eye lenses formed, respectively, with a plurality of annular concentric convex lenticular surfaces, some of said annuli terminating on opposed sides along parallel chords coincident with the proximate edges of the respective lenses.

2. In a lantern, in combination, a plurality of bull's-eye lenses formed, respectively, on their outer surfaces with a plurality of parallel, convex, lenticular surfaces and on their inner surfaces with a plurality of annular, concentric convex, lenticular surfaces, the proximate edges of said lenses being formed along chords of certain of the annuli.

This specification signed this 14th day of July A. D. 1924.

ARTHUR V. CONOVER.